F. M. CASE.
DETACHABLE PIPE COUPLING.
APPLICATION FILED JUNE 23, 1911.
1,005,153.
Patented Oct. 10, 1911.
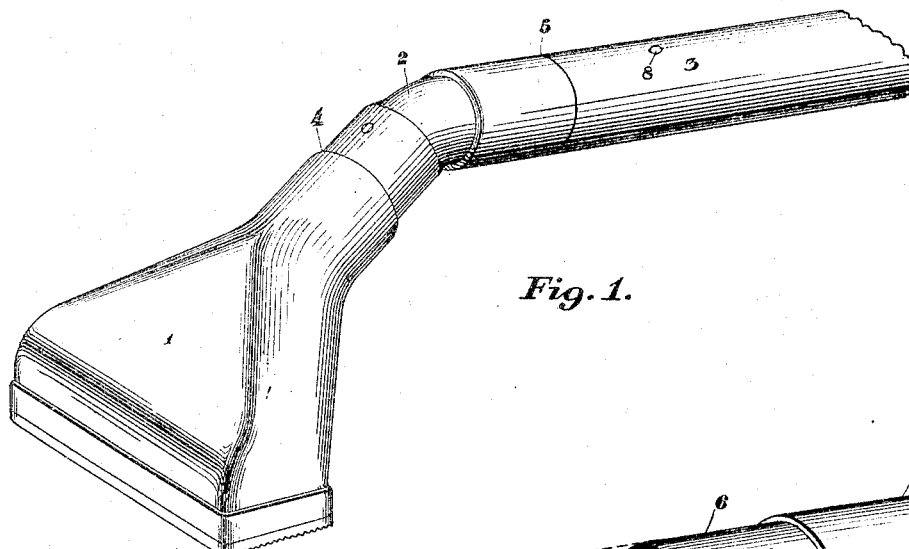
Fig. 1.
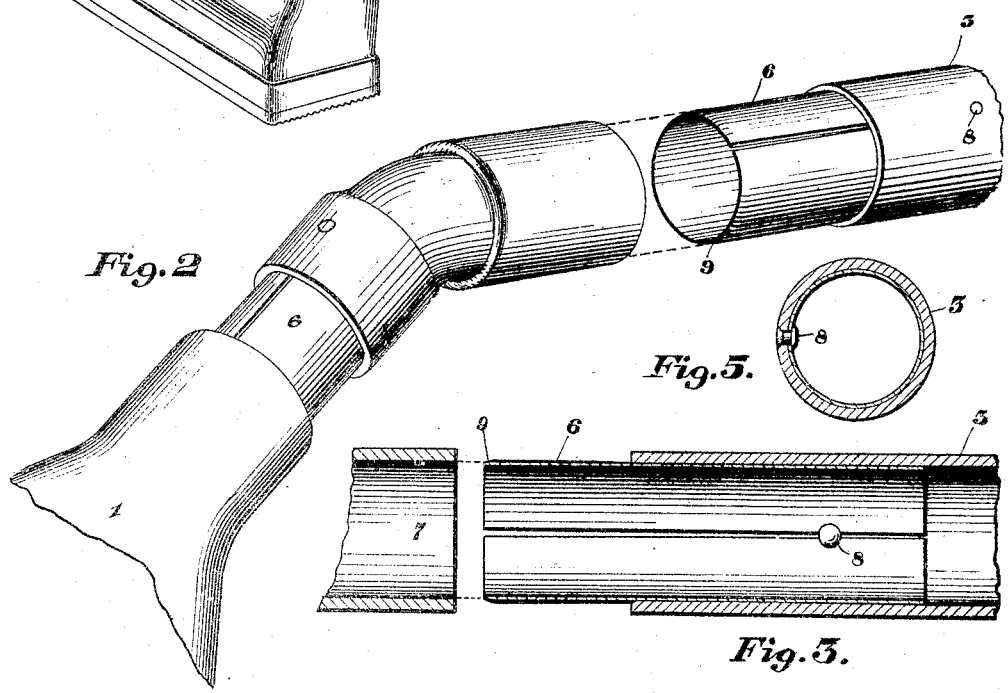
Fig. 2.
Fig. 5.
Fig. 3.
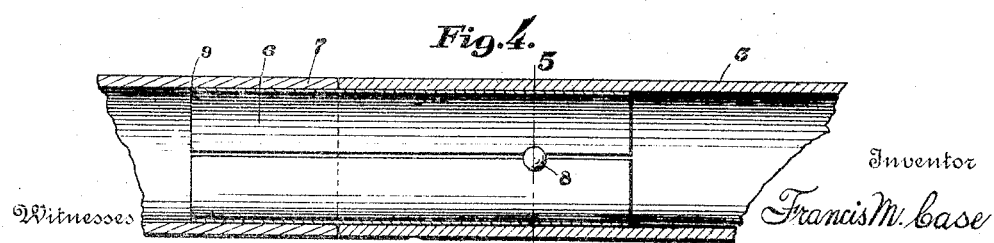
Fig. 4.
Witnesses
Harry O. Rastetter
Irene Lutz.
Inventor
Francis M. Case
By Bond & Miller
Attorneys

UNITED STATES PATENT OFFICE.

FRANCIS MILLS CASE, OF CLEVELAND, OHIO, ASSIGNOR TO THE HOOVER SUCTION SWEEPER COMPANY, OF NEW BERLIN, OHIO, A CORPORATION OF OHIO.

DETACHABLE PIPE-COUPLING.

1,005,153.     Specification of Letters Patent.     Patented Oct. 10, 1911.

Application filed June 23, 1911. Serial No. 634,968.

*To all whom it may concern:*

Be it known that I, FRANCIS MILLS CASE, a citizen of the United States, residing at Cleveland, in the county of Cuyahoga and State of Ohio, have invented a new and useful Detachable Pipe-Coupling, of which the following is a specification.

My invention relates to improvements in pipe couplings in which the parts are adapted to be readily and quickly connected and disconnected, the device being especially adapted for use as a coupling for air pipes used in connection with pneumatic sweepers and cleaners now commonly employed in the cleaning of carpets, rugs, draperies and the like, although the invention may be used to considerable advantage in many other devices and for many kinds of pipes.

The object of the improvement is to provide a detachable pipe coupling which will be simple in construction, cheaply manufactured and very convenient in use while at the same time forming a substantial, tight and sufficiently rigid joint between the pipes coupled. These objects, together with other objects readily apparent to those skilled in the art, I attain by the construction illustrated in the accompanying drawings, although my invention is capable of embodiment in other forms, the construction illustrated being chosen by way of example.

In the drawings Figure 1 is a perspective view of a pneumatic cleaner nozzle connected to a pipe by means of an intermediate elbow and two couplings embodying my invention. Fig. 2 is an enlarged perspective view of the same parts as illustrated in Fig. 1, the nozzle, elbow and pipe being separated from each other to more fully illustrate the construction and a portion of the nozzle being broken away. Fig. 3 is a longitudinal section through a coupling embodying my invention, the parts being separated or detached. Fig. 4 is a longitudinal section through a coupling embodying my invention showing the parts connected. Fig. 5 is a transverse section through a coupling embodying my invention, said figure being taken on a plane indicated by the line 5—5 in Fig. 4.

Throughout the several views similar reference numerals indicate similar parts.

The numeral 1 indicates a pneumatic cleaning nozzle which, in so far as its construction and function as a nozzle is concerned, forms no part of the present invention, said nozzle being illustrated to show one of the practical and important uses of my invention.

The numeral 2 indicates an elbow intermediate the nozzle 1 and pipe 3 to which the nozzle is connected.

The joints between the nozzle 1 and elbow 2 and between the elbow 2 and pipe 3 are indicated by the numerals 4 and 5 respectively.

In Fig. 2 the pipe 3 is shown disconnected from the elbow 2 and the elbow 2 is shown partly disconnected from the nozzle 1. It will be noted that the pipe 3 is provided with a projecting, internal, split, spring collar 6 and that the elbow 2 is likewise provided with a projecting, internal, split, spring collar 6. The collar forms an important part of the invention as hereinafter will more fully appear. It will be understood that the elbow and nozzle in the drawings are shown only by way of illustrating one use of the device and that the portion of said elbow and said nozzle into which the spring collar enters may, in general, be called the receiving member of the coupling, whether the coupling be for elbows, nozzles or pipes.

Referring now more particularly to Figs. 3, 4 and 5 the member 7 is the receiving member, the spring collar 6 the entering member, while the numeral 3 indicates the pipe or member to which the entering member is connected. The internal diameter of the members 7 and 3 is preferably the same, although one of the principal advantages of the present invention is that the receiving member may have various diameters within a limited range without materially affecting the operation of the device. The entering member or collar 6 is formed of spring material such as steel or spring brass, said collar being in the form of a split tube. One end of the collar is inserted into the member 3 and a rivet 8 is employed to hold said collar in fixed position within said member and in close engagement with the inner wall of the same. Said rivet is so located as to pass between the edges of the cleft in the collar and is of sufficient diameter to engage the said edges of the collar along the cleft and expand said collar sufficiently to cause it to very snugly engage the inner wall of the member 3. It is preferable to very slightly notch the collar on each of the edges of the cleft where the rivet passes through so as to provide against any longitudinal movement of said collar. In case the edges are so notched the rivet should still be of sufficient diameter to expand the collar as just above described. By so expanding the collar by means of the rivet said collar is caused to so closely engage the inner wall of the member 3 as to produce a tight joint. The rivet 8 is the only means of connection between the collar 6 and member 3, said collar preferably, but not necessarily, extending into the member 3 a distance substantially equal to twice the diameter of said member, and the rivet 8 located well back toward the inner end of said collar. This gives a more substantial and rigid connection between the member 3 and collar 6. The cleft in the collar 6 at its outer or entering end is expanded or made wider so that the external diameter of the collar at the end will normally be greater than the internal diameter of the receiving member into which it is adapted to be inserted. It should also be stated that while the projecting end of the collar is flared or sprung to a greater diameter, the entire collar from end to end before attachment to the member 3 is sprung so as to have an external diameter greater than the internal diameter of the pipe 3 and is forced into place in said pipe, the said collar thus having a tendency to press outwardly and hug the inner side of the pipe 3.

At the extreme outer end of the collar 6 the said collar is externally tapered or drawn inwardly as at 9 to assist in the operation of coupling. When it is desired to couple the members 3 and 7 it is only necessary to insert the projecting end of the collar into said member 7. In doing this it is usually desirable to at first hold the receiving member and the collar at a slight angle to each other, which, together with the beveled edges at 9, will assist materially in crowding or reducing the flared end of the collar to such diameter as to permit it to enter the member 7. In Fig. 3 the dotted lines extending from the member 7 to the end of the collar 6 show that the internal diameter of the member 7 is less than the external diameter of the collar 6 when it is disconnected. When the connection has been made as in Fig. 4, where the member 7 is slipped upon the collar 6 sufficiently to abut against the end of the pipe 3, it will be noted that the collar 6 has been sufficiently contracted so that the width of the cleft in said collar is substantially the same from end to end. It will be understood that because of its spring action the collar will hug the member 7 in such way as to produce considerable frictional hold as between said collar and member and form a rigid and tight joint. This joint, in a practical coupling, will be substantially air and water tight for all usual pressures, leakage at the joint at that point where the cleft is located being prevented by the member 7 and pipe 3 having closely fitting abutting ends.

The coupling may be very readily connected and disconnected and the advantage of the construction will be more fully appreciated when it is remembered that with the modern pneumatic cleaning devices many nozzles and connections of different kinds are employed and it is desirable to change these nozzles and connections more or less frequently as the character of the work may demand. While it is possible to provide all of such nozzles and connections with receiving members of exactly the same internal diameter, yet as a matter of practical manufacture there usually is a slight variation in this diameter among the different nozzles and connections. If this difference amounts to but an extremely small fraction of an inch it will produce unsatisfactory results including loose nozzles and joints if an ordinary slip joint be employed. With my invented device, however, the entering member or collar, in the operation of coupling, is contracted only sufficiently to enter the receiving member whatever its exact internal diameter may be, and the spring action of said collar upon the wall of the receiving member serves to keep the parts in place and maintain a tight and rigid joint. The superiority of my construction, from a commercial standpoint, the standpoint of the manufacturer and that of the user will therefore be readily apparent, as no trouble will be experienced in making the necessary connections and the receiving members need not be made to an absolute standard of internal diameter. Heretofore nozzles and similar devices have frequently been connected by means of a coupling comprising a tapered entering member and a correspondingly tapered receiving member. When connection is made in this manner the parts frequently work loose with but slight use and give considerable annoyance. In other cases the well known screw thread coupling has been employed, but with considerable dissatisfaction because of the slow and unhandy operation of coupling required. In the coupling herein described all of these and similar undesirable features are absent, and a substantial, tight and sufficiently rigid joint can readily be made.

I claim:—

1. A detachable pipe coupling comprising a first, internal, cylindrical member provided with a projecting, internal, split, spring collar, said collar connected to said first member by fastening means extending through the wall of said first member and through the cleft of said collar and an internally cylindrical receiving member having substantially the same internal diameter as said first member, said collar having its outer end expanded so that its external diameter is normally greater than the internal diameter of the receiving member, said outer end adapted to be contracted so as to permit its entering the receiving member, whereby said receiving member and said first member may be detachably coupled.

2. A detachable pipe coupling comprising a first, internally cylindrical member provided with a projecting, internal, split, spring collar, said collar connected to said first member by fastening means extending through the wall of said first member and through the cleft and the edges of the cleft of said collar and an internally cylindrical receiving member having substantially the same internal diameter as said first member, said collar having its outer end expanded so that its external diameter is normally greater than the internal diameter of the receiving member, said outer end adapted to be contracted so as to permit its entering the receiving member, whereby said receiving member and said first member may be detachably coupled.

3. A detachable pipe coupling comprising a first, internally cylindrical member and a second, internally cylindrical member, the internal diameters of said members being substantially the same, said first member provided with a collar made of spring material in the form of a split tube, one end of said collar inserted into the first member, fastening means connected to said first member and extending between the edges of the cleft in said collar, said collar so formed that the cleft in the projecting portion is normally of greater width than the cleft in that portion of said collar within the first member, whereby the diameter of said projecting portion is normally greater than the internal diameter of the said second member, and said projecting portion adapted to be reduced in diameter by forcing the edges of the cleft toward each other, whereby said projecting portion may be slidably inserted within said second member.

4. A detachable pipe coupling comprising a first, internally cylindrical member provided with a projecting, internal, split, spring collar, said collar connected to said first member by fastening means extending through the wall of said first member and through the cleft of said collar, said fastening means holding the edges of said cleft apart to cause said collar to hug the inner wall of said first member, and an internally cylindrical receiving member having substantially the same internal diameter as said first member, said collar having the edges in the cleft of its outer, projecting portion spaced from each other to expand said collar in said projecting portion so that its external diameter is normally greater than the internal diameter of the receiving member, and said outer end adapted to be contracted so as to permit its entering the receiving member, whereby said receiving member and said first member may be detachably coupled.

5. A detachable pipe coupling comprising a first, internally cylindrical member provided with a projecting, internal split, spring collar, said collar connected to said first member by fastening means extending through the cleft of said collar, said fastening means holding the edges of said cleft apart to cause said collar to hug the inner wall of said first member, and an internally cylindrical receiving member having substantially the same internal diameter as said first member, said collar having the edges in the cleft of its outer, projecting portion spaced from each other to expand said collar in said projecting portion so that its external diameter is normally greater than the internal diameter of the receiving member, and said portion adapted to be contracted so as to permit its entering the receiving member, whereby said receiving member and said first member may be detachably coupled.

In testimony that I claim the above, I have hereunto subscribed my name in the presence of two witnesses.

FRANCIS MILLS CASE.

Witnesses:
WILLIAM H. MILLER,
IRENE LUTZ.